June 22, 1926.
C. R. HASKELL
DEVICE FOR MAKING TUBULAR FARINACEOUS ROLLS
Filed Feb. 19, 1925
1,589,849
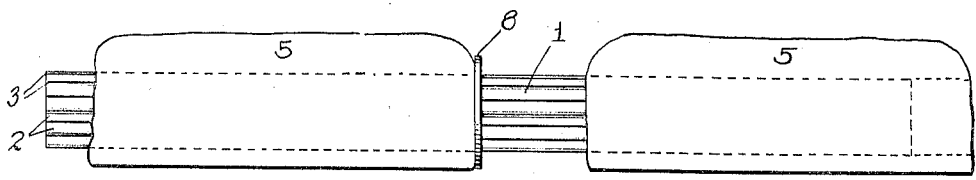
Fig. 1.
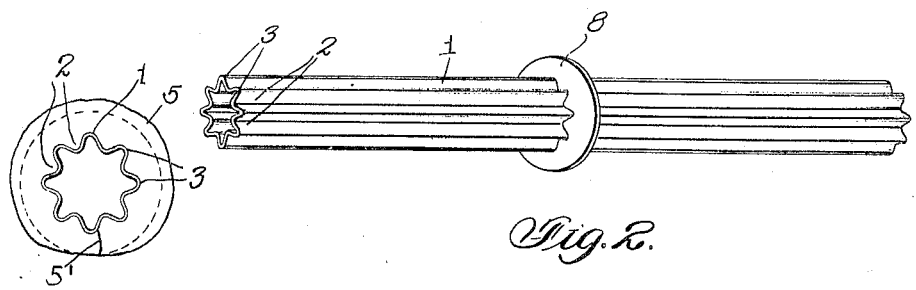
Fig. 2.
Fig. 3.
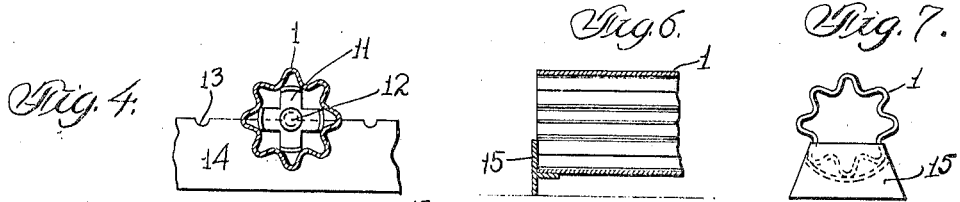
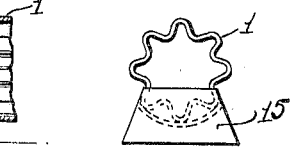
Fig. 6.   Fig. 7.
Fig. 4.
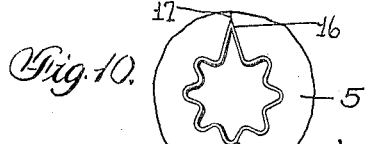
Fig. 10.
Fig. 8.
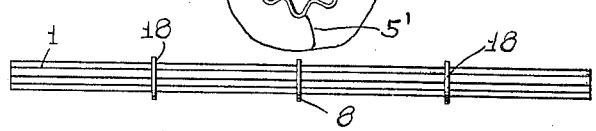
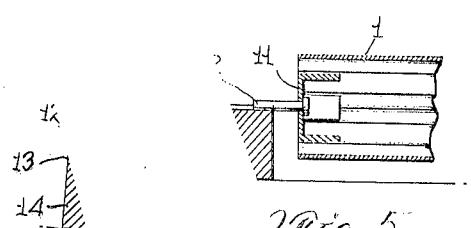
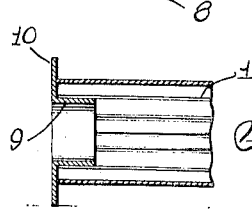
Fig. 9.  C. Ray Haskell.
E. W. Anderson
Fig. 5.
By
Inventor
Attorney Patented June 22, 1926.

1,589,849

UNITED STATES PATENT OFFICE.

CHARLES RAY HASKELL, OF YOUNGSTOWN, NEW YORK, ASSIGNOR TO HASKELL CORPORATION, OF NIAGARA FALLS, NEW YORK, A CORPORATION OF NEW YORK.

DEVICE FOR MAKING TUBULAR FARINACEOUS ROLLS.

Application filed February 19, 1925. Serial No. 10,359.

The invention has relation to a device for use in making tubular farinaceous rolls, having for an object to provide a device to facilitate the making of such rolls baked inside and out and yet retaining the characteristics of rolls of the usual variety in that they have a similar appearance and the inside thereof is sufficiently soft, the longitudinal bore or perforation of the roll being adapted to receive and to confine therein any suitable filling, such as a sausage or "hot dog", a slice of meat rolled up, or in fact any other edible filling, which in the case the roll is made of cake, would be custard, whipped cream or other filling.

The invention consists in the novel construction and combinations of parts, as set forth in the appended claims.

In the accompanying drawings illustrating an embodiment of the invention, Figure 1 is a side view of the invention with one roll in place and another partly removed; Figure 2 is a perspective view of the invention; Figure 3 is an end view of the same with the roll in place thereon; Figure 4 is a transverse section of the device looking outwardly and showing a modification for holding the tubular roll suspended from the former; Figure 5 is a fragmentary longitudinal section of one end of the device; Figure 6 is a similar view of another modification for holding the roll so suspended; Figure 7 is an end view of the same; Figure 8 is a side view of another modification for making more than two rolls simultaneously; Figure 9 is a fragmentary sectional view of one end of another modification having a removable annular end gage, and Figure 10 is an end view of another modification having a longitudinal blade for forming a weak bridge joint in the farinaceous roll.

In these drawings, the numeral 1 designates a former or mold of cylindrical form basically and having longitudinal parallel grooves 2 and intermediate ridges 3 and adapted to be rolled upon a plug or piece of dough of sufficient size to form the farinaceous roll 5, said grooves adapting the device to pick up or accumulate thereon said dough in the rolling pressure of the device, said dough being thereby distributed around said former in the shape of a tube and having its longitudinal joint 5' sealed or closed in said rolling pressure. The roll with the former contained therein are then both placed in an oven wherein the roll is baked, the tubular walls of said roll which are of approximately the same thickness throughout although subject to natural irregularities being in the baking caused to expand or rise under the action of the yeast or baking powder constituent to several times their original volume or thickness, after which the roll 5 is stripped from said former by being slid endwise thereof, the longitudinal grooves of said former admitting of such removal without mutilation or crumbing of the crusty lining of the perforation or bore of said roll, said lining conforming to or being molded by said grooves and ridges so that it also is provided with longitudinal grooves and ridges.

The preferred embodiment of the invention is of double or twin form, the two aligned twin formers being united end to end or made of the same piece of material and carrying centrally thereof a transverse annular laterally projecting gage 8, common to both of and of a diameter greater than that of said formers, said gage, in the rolling pressure of said formers limiting the thickness of the side walls of the tubular rolls of dough accumulated thereon, thereby standardizing the size or thickness of the baked roll, making the exterior or convex superficies thereof more smooth or even and serving as a spacer or separator of the two rolls of dough. The double former with the two rolls accumulated thereon are then both placed in an oven and baked, after which the two baked rolls are removed endwise of said former, in opposite directions.

The hollow bore of the longitudinally grooved mold or former admits the heat of the oven thereto so that the lining of the perforation or bore of the tubular roll is also baked with a crust more than would be the case were said former not hollow.

A modification of the invention is shown in Figure 9 wherein said former is provided at one end with a removable plug 9 bearing an annular gage 10 of the same size as that of the gage 8 and serving to prevent the tilting of said former.

Another modification is shown in Figures 4 and 5 wherein said former is provided at each end with a plug 11 bearing a central pin 12, said former being thereby adapted to be supported in raised position in the oven by engagement of said pins with seats 13 of a support 14, whereby the roll is baked while in suspension from said former, thereby avoiding flattening of the bottom of said roll which would otherwise rest upon the floor of the oven. The pins 12 may be used as handles in rolling said former upon the dough if desired, or, for the purpose of so holding the roll in raised position a support 15 may be engaged under each end of said former to a slight extent, as shown in Figure 7.

Another modification is shown in Figure 10, wherein said former is provided with a longitudinal blade 16, engaging a side wall of the tubular farinaceous roll and making a weak bridge joint 17 therein longitudinally thereof, along which said roll may be readily opened with the hands in case it is desired to remove the roll laterally instead of endwise of the said former and admitting of the insertion of the edible filling laterally of the roll.

Another modification is shown in Figure 8 wherein said former is made up of more than two aligned formers, each capable of making one farinaceous roll, the device in this case having one or more endwise removable annular gages 18, of the same size as the gage 8 and having the same function.

If desired, a slight taper may be given the said former not sufficient however to interfere with its basically cylindrical form preferably and yet facilitating the removal of the farinaceous roll from said former.

I claim:—

1. A device for making tubular farinaceous rolls consisting of a former having longitudinal grooves for accumulating thereon the dough in tubular form and uniting the longitudinal joint thereof, said longitudinal grooves being adapted to facilitate the tubular roll being removed endwise from said former.

2. A device for making tubular farinaceous rolls consisting of a former having surface irregularities for accumulating thereon the dough in tubular form and uniting the longitudinal joint thereof and having an annular gage of greater diameter than said former for determining the thickness of the dough of said roll.

3. A device for making tubular twin farinaceous rolls consisting of a former having longitudinal grooves for accumulating thereon the dough in tubular form and uniting the longitudinal joint thereof, and having a central annular gage of greater diameter than said former, said grooves being adapted to facilitate the tubular twin rolls being removed in opposite directions endwise from said former.

4. A device for making tubular twin farinaceous rolls, comprising a former adapted in the rolling pressure thereof upon the dough to accumulate the dough thereon in tubular form and unite the longitudinal joint thereof and having a central annular gage for determining the thickness of the dough and separating the twin rolls, and means for supporting said former and said gage in raised position.

5. A device for making tubular twin farinaceous rolls, comprising a longitudinally grooved former adapted in the rolling pressure thereof upon the dough to accumulate the same thereon in tubular form and unite the longitudinal joint thereof and having a central annular gage for determining the thickness of the dough and separating the twin rolls, said former being hollow to admit the heat of the oven to the interior thereof.

6. A device for making tubular twin farinaceous rolls, comprising a longitudinally grooved former adapted in the rolling pressure thereof upon the dough to accumulate the same thereon in tubular form and unite the longitudinal joint thereof and having a central annular gage for determining the thickness of the dough and separating the twin rolls, said former being hollow to admit the heat of the oven to the interior thereof, and having a removable annular end gage.

7. A device for making tubular farinaceous rolls, comprising a former adapted in the rolling pressure thereof upon the dough to accumulate the same thereon in tubular form and unite the longitudinal joint thereof and having means for forming a longitudinal weak bridge joint in the roll the full length thereof.

8. A device for making tubular farinaceous rolls, comprising a former adapted in the rolling pressure thereof upon the dough to accumulate the same thereon in tubular form and unite the longitudinal joint thereof and having a longitudinal blade for partially dividing the dough along one side the full length thereof to form a weak bridge joint therein.

9. A device for making tubular farinaceous rolls, comprising a longitudinally grooved former adapted in the rolling pressure thereof upon the dough to accumulate the same thereon in tubular form and unite the longitudinal joint thereof and having a central annular gage for determining the thickness of the dough and separating the rolls, and removable intermediate gages.

In testimony whereof I affix my signature.

C. RAY HASKELL.